TELEPHONE SYSTEM

Original Filed Aug. 16, 1924 7 Sheets-Sheet 1

Inventor
Richard Mercer—Frank Tench
R. B. Richardson Atty.

TELEPHONE SYSTEM

Original Filed Aug. 16, 1924 7 Sheets-Sheet 2

Inventor
Richard Mercer—Frank Tench
R. B. Richardson Atty.

TELEPHONE SYSTEM

Original Filed Aug. 16, 1924 7 Sheets-Sheet 3

Inventor
Richard Mercer—Frank Tench
R. B. Richardson Atty.

TELEPHONE SYSTEM

Original Filed Aug. 16, 1924 7 Sheets-Sheet 4

Inventor
Richard Mercer — Frank Tench
R. G. Richardson Atty.

TELEPHONE SYSTEM

Original Filed Aug. 16, 1924 7 Sheets-Sheet 5

Inventor
Richard Mercer — Frank Tench
R. B. Richardson Atty.

TELEPHONE SYSTEM

Original Filed Aug. 16, 1924 7 Sheets-Sheet 6

Part 1

Inventor
Richard Mercer — Frank Tench
R. B. Richardson Atty

Aug. 29, 1933. R. MERCER ET AL Re. 18,927
TELEPHONE SYSTEM
Original Filed Aug. 16, 1924 7 Sheets-Sheet 7
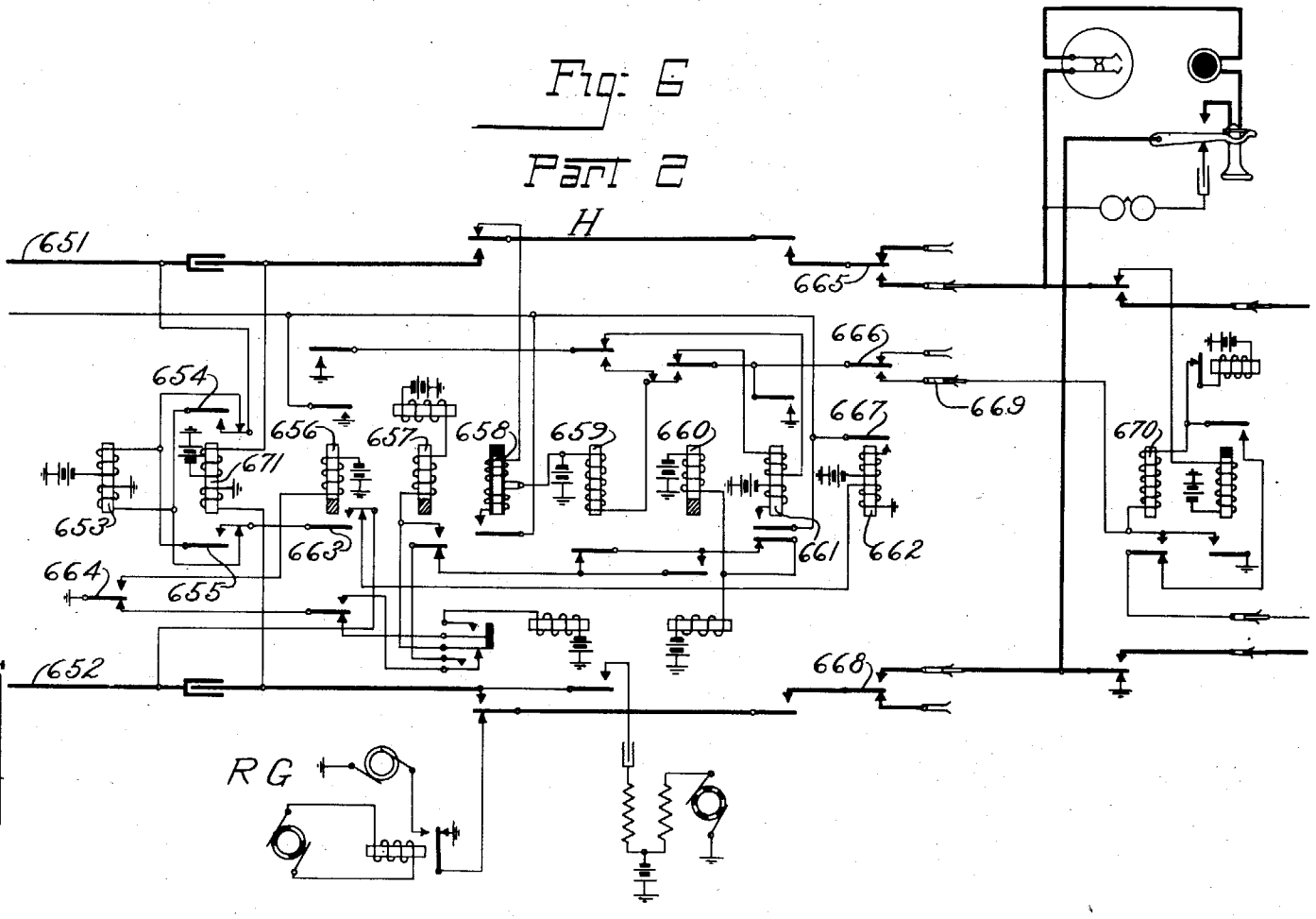
Inventor
Richard Mercer Frank Tench
R. S. Richardson Atty.

Reissued Aug. 29, 1933 Re. 18,927

UNITED STATES PATENT OFFICE 18,927

TELEPHONE SYSTEM

Richard Mercer, Harrow, and Frank Tench, West Norwood, London, England, assignors, by mesne assignments, to Associated Electric Laboratories, Inc., Chicago, Ill., a Corporation of Delaware Original No. 1,705,834, dated March 19, 1929, Serial No. 732,355, August 16, 1924, and in Great Britain September 18, 1923. Renewed May 19, 1928. Application for reissue April 20, 1931. Serial No. 531,594

29 Claims. (Cl. 179—18)

Figure 1:
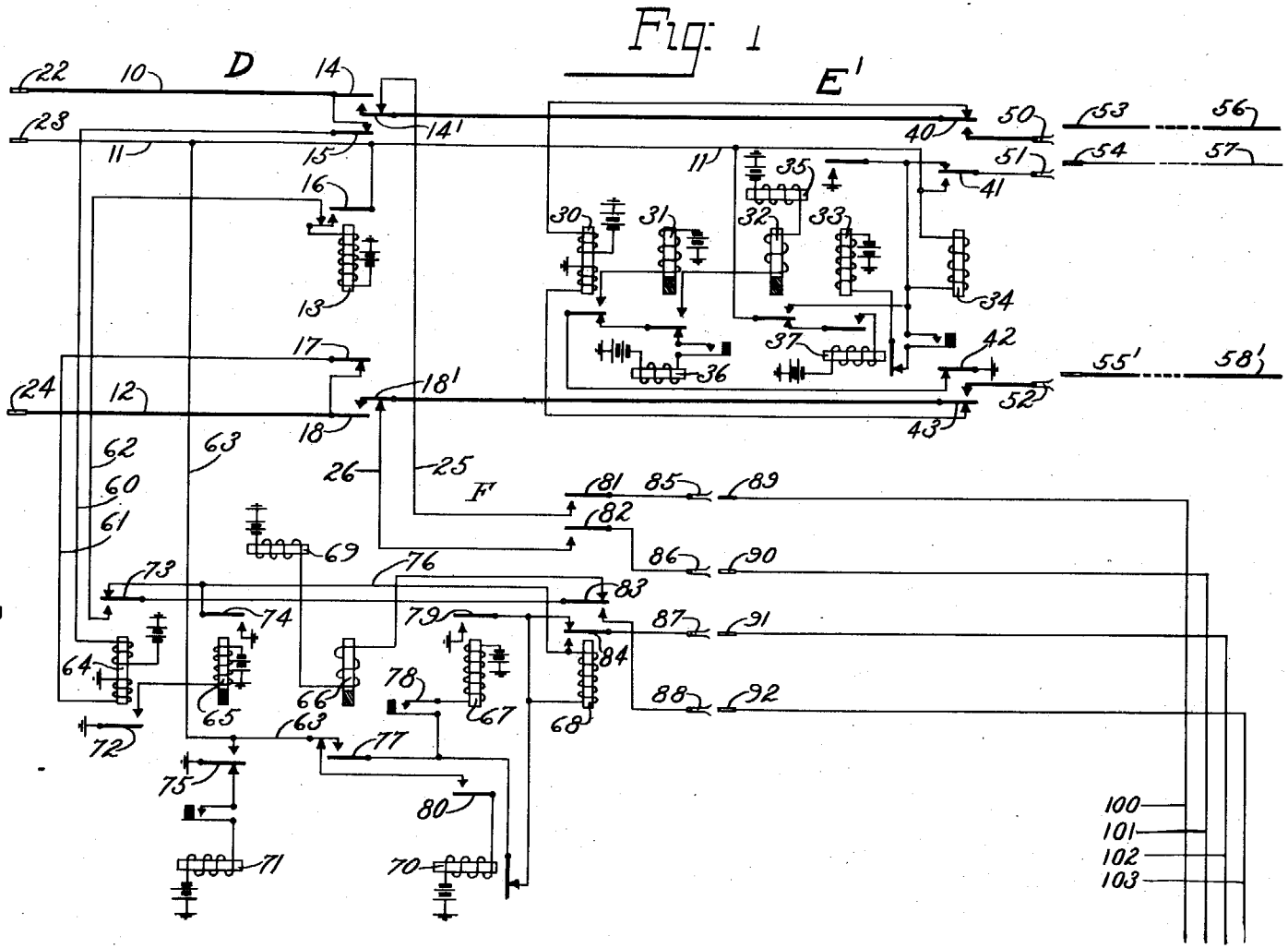
Figure 2:
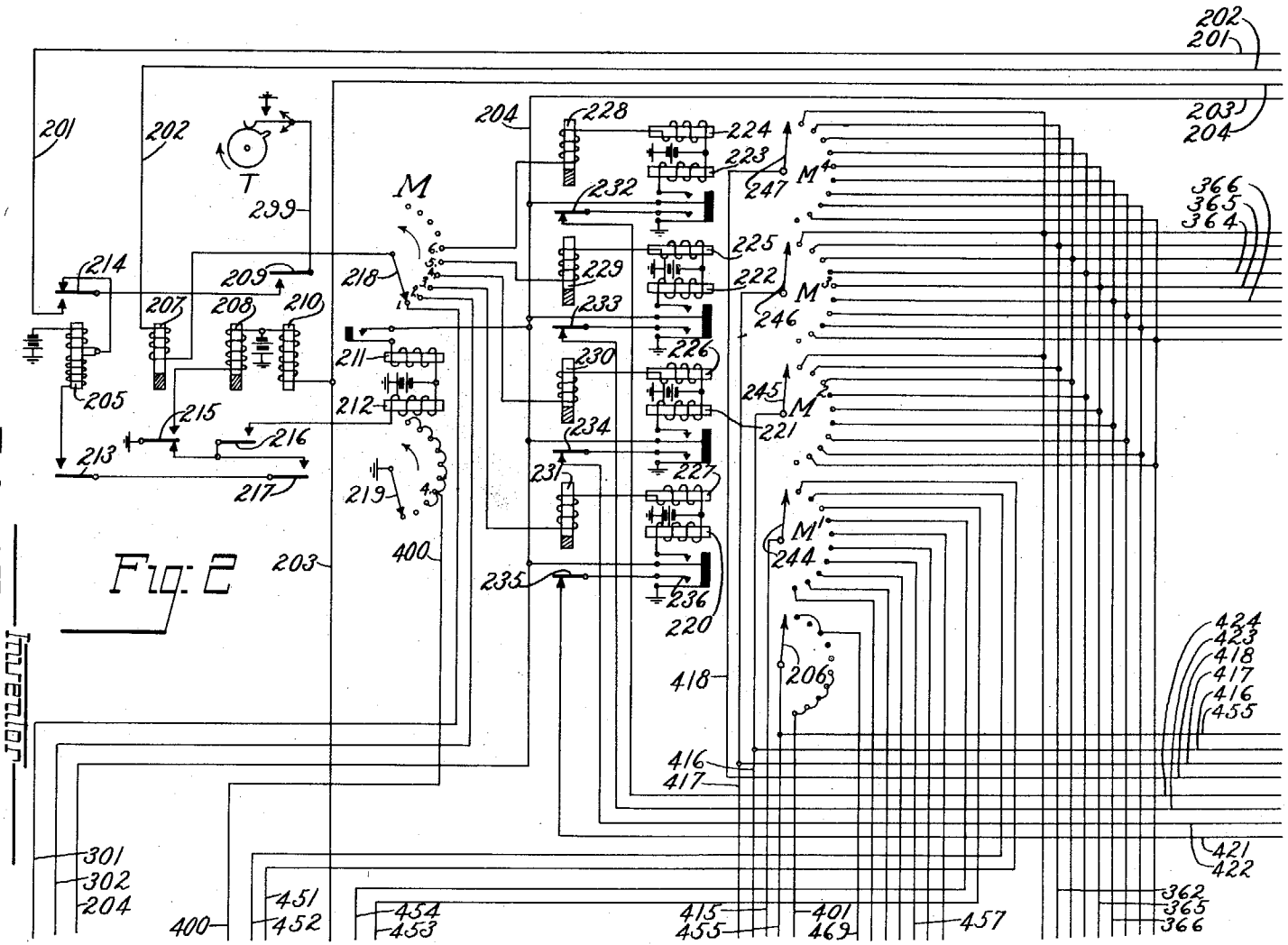
Figure 3:
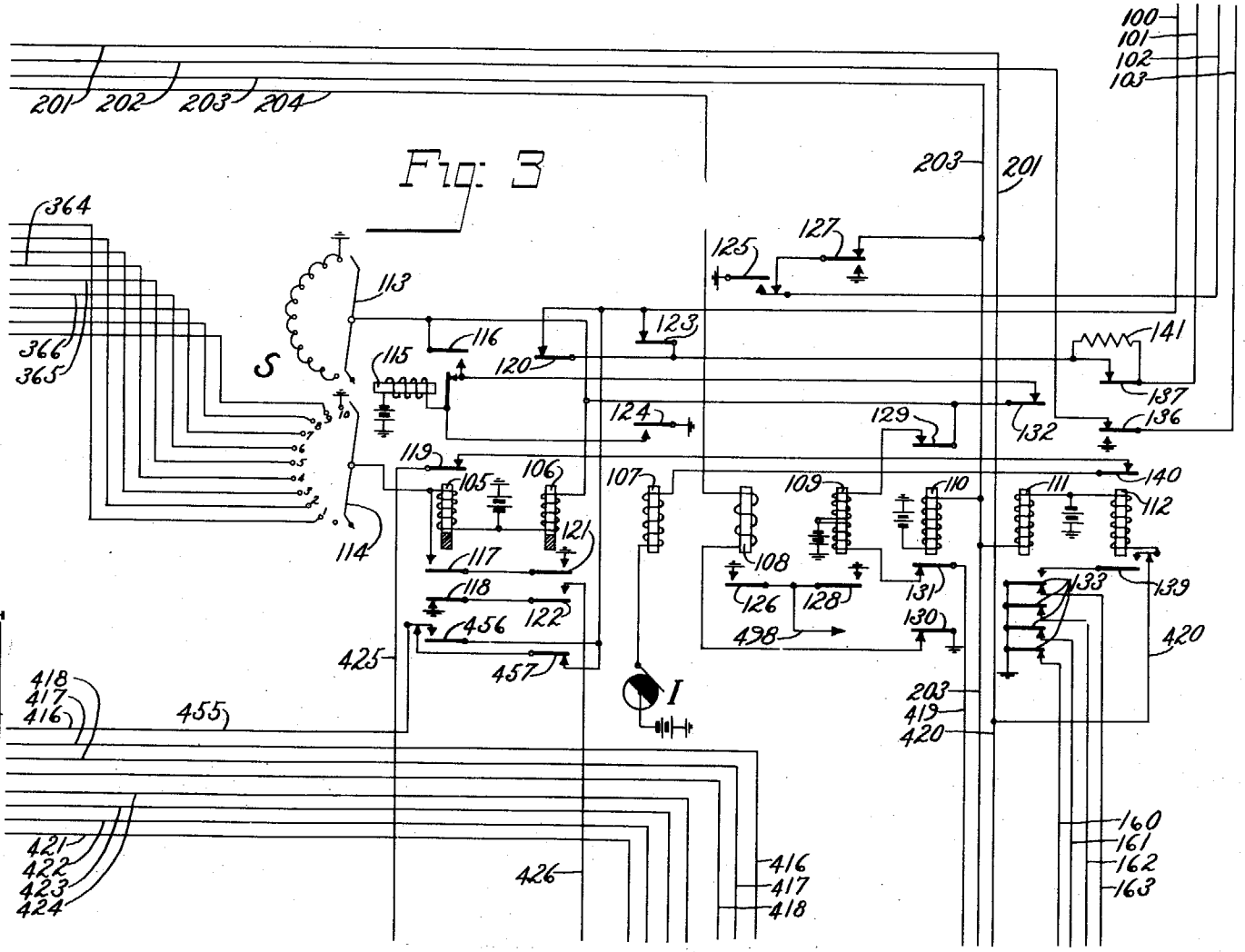
Figure 4:
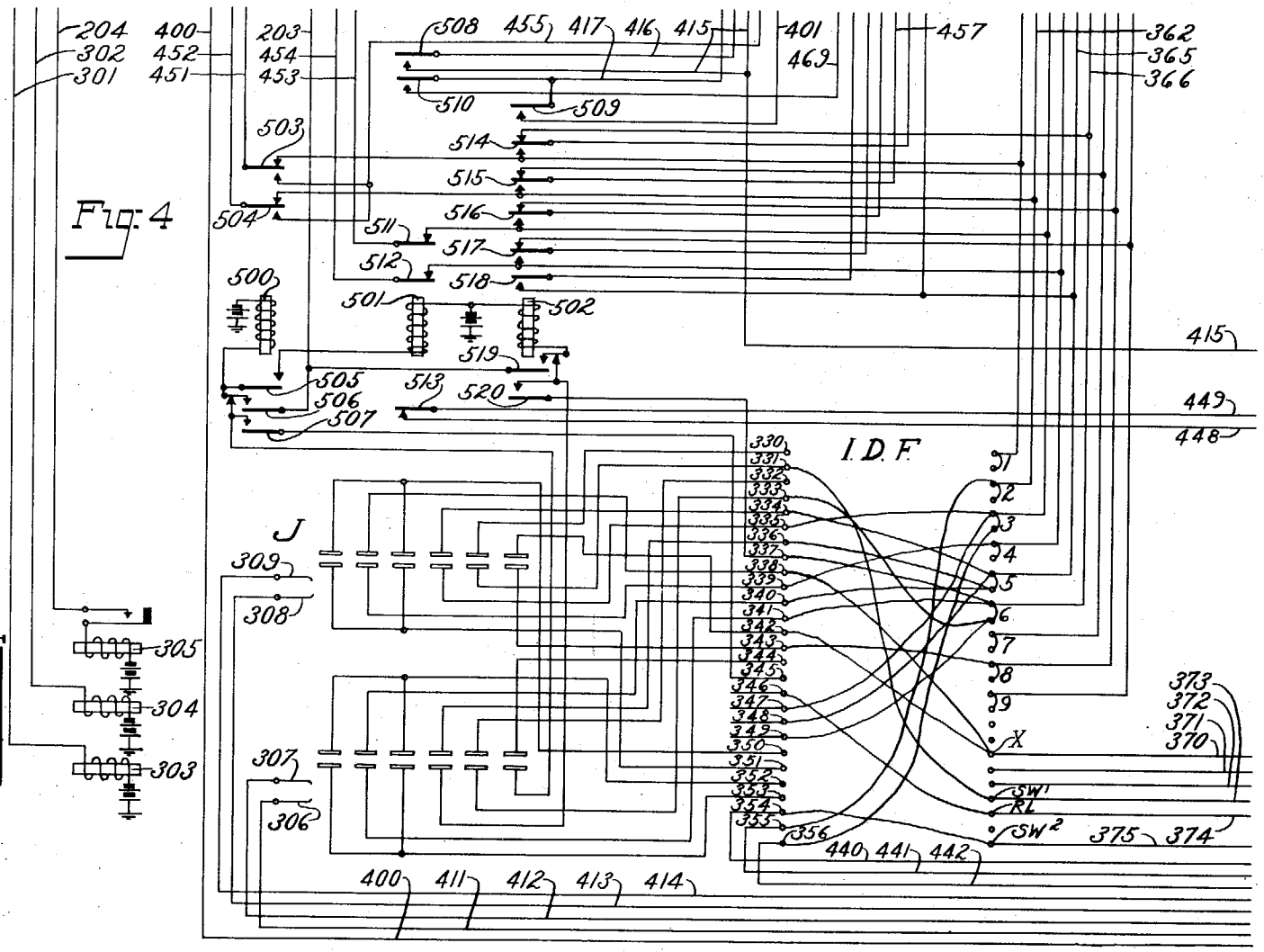
Figure 5:
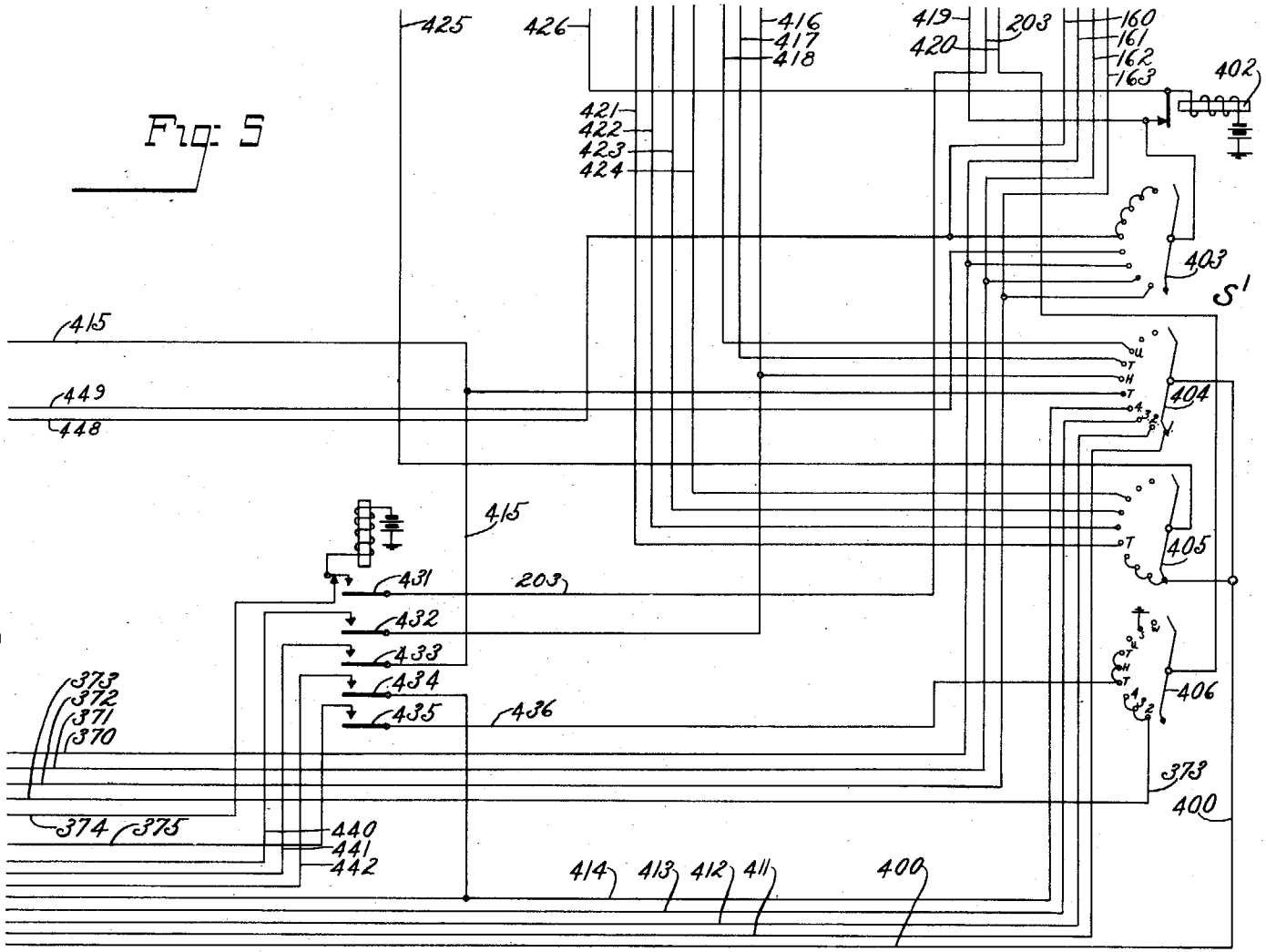
Figure 5:
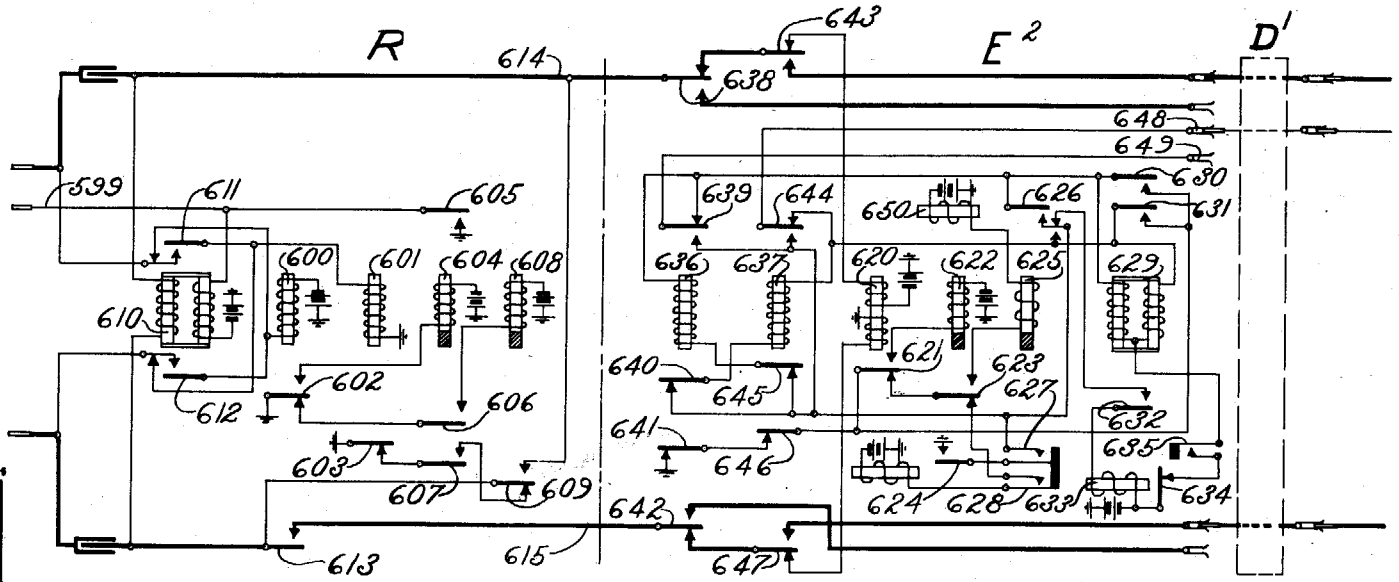

The present invention concerns improvements in or relating to telephone systems and more particularly arrangements for more economically laying out exchanges than has hitherto been practised. Further the invention relates to improvements in telephone systems using step-by-step switches of the Strowger type having two directions of movement. It is well known that such switches as usually employed are arranged to have 10 steps in one direction and 10 steps in the other direction making a total of 100 contacts available. It has also been proposed to use a number of sets of wipers so that the capacity of such switches can be increased without materially affecting the constructional details, and the object of the invention more particularly concerns arrangements for more economically using or arranging the standard type of switches whether with one or more sets of wipers so that they can be controlled by an impulse sender of the standard type capable of generating up to 10 impulses for each operation thereof.

Previously in arrangements proposed for laying out a system employing Strowger type switches more economically than is usual with the ordinary decimal system, it has been necessary either to provide special dial switches or special controlling mechanisms for the switches, either of which alternatives necessitates a considerable departure from standard practice in the construction of the apparatus concerned. In one arrangement however it has been proposed to use large capacity switches in which there was more than one means of access to the switch and a relay connected in the test conductor of one of the means of access, when operated, switched over one set of normally connected wipers and inserted a second set of wipers of a large capacity switch. A feature of the present invention is that a register translator is employed for converting the impulses dialled by a calling party into a combination of switch operating impulses and a relay controlling impulse or switching current so that the switching over of the wipers takes place independently of the switch operating impulses. The only modifications contemplated to the switches themselves consists of providing an additional set of wipers, an additional bank of contacts and a switching relay adapted when operated to disconnect the normal set of wipers and connect up the second set, the remainder of the control being effected from the register translator.

According to one feature of the invention, in a telephone system employing register translators, controlling arrangements for effecting the translation are modified in such a manner that a switching current is adapted to be transmitted in addition to series of stepping impulses. The expression "stepping impulses" will be understood to mean impulses of the ordinary type such as circuit interruptions for operating step-by-step switches, while the term "switching current" is to be taken to mean a special current transmitted over the line for effecting a switching operation which will in general be changing over from one set of wipers to another, but may also be taken to include changing over from one switch to another.

According to another feature of the invention in a telephone system employing register translators, in addition to the translation of the portion of the number comprising the exchange designation of a called party, a translation is also effected of the numerical designation into a combination of stepping impulses and a switching current.

A further feature of the invention is that a device in the register translator responsive to the dialling of a certain exchange or exchanges determines whether the switches in such exchanges are to be set by stepping impulses corresponding to those dialled by a calling party or whether a translation of the impulses dialled is to be effected.

Still another feature of the invention is the provision of a plurality of means for translating the impulses corresponding to the numerical designation of the wanted party, the particular translating means, if any, which is employed, being determined in accordance with the exchange required. The means employed may be such that when the register has recorded a particular digit or digits, the impulse sending device is so controlled that one of the digits stored is not transmitted. This permits the number of switching stages in the required exchange to be reduced below that corresponding to the number of digits in the numerical designation of the wanted subscriber—since the necessary selection corresponding to the digit which has been suppressed is taken care of by suitable wiper selection of the switches employed.

These and other features not specifically mentioned at this point will be better understood from the following description taken in conjunction with the accompanying drawings. It will be understood however that the particular arrangement illustrated is given by way of example only and that various modifications in the circuit details could be made by those skilled in the art without departing from the spirit of the invention.

It will be assumed in the description that all the switches employed have only two sets of wipers, since up to the present this is the maximum number which has been successfully employed in practice. The invention, however, must not be considered as limited to two sets of wipers as theoretically there does not appear to be any reason why three sets or more could not be used. The particular objection is that owing to the additional power required for operating the switch, particularly on the rotary movement, it would probably be necessary to redesign the operating magnets, and this would necessitate a considerable departure from the apparatus used at present. It is an important feature of the present invention that the apparatus employed should as far as possible differ so slightly from existing apparatus as to ensure that there is no departure from principles already well established in practice.

Referring now to the drawings comprising Figs. 1–6, these show by means of the usual circuit diagrams sufficient of the apparatus to enable the invention to be understood. The general arrangement is very similar to that shown in the British patent specification No. 194,580 and the alterations which have been made from the circuits shown in that specification are such as still to permit the normal working to be carried out as therein indicated. The invention will be best understood if the normal working is first described briefly and then the different operations which take place when calls are set up to exchanges in which the novel features of the invention are applied.

Suppose in the first instance that a subscriber in the Western exchange wishes to call another subscriber whose number is TORington 2345; he will therefore first dial the letters TOR and then the numbers 2345. Assume further that the first selector trunk D extending to the selector E′ shown in Fig. 1 is seized over the contacts 22, 23, and 24 by the calling party's primary line switch which is of wellknown type and therefore not shown. When the line switch switches through a circuit is completed for the line relay 64 of the register selector F associated with the first selector trunk D and this relay at armature 72 completes a circuit for release relay 65, and at armature 73 prepares the impulsing circuit. The operation of relay 65 connects earth at armature 75 over lead 63 to release trunk conductor 11 so as to maintain the subscriber's line switch operated.

When the first letter T is dialled, four interruptions are produced in the circuit of relay 64 and it de-energizes accordingly, each time completing a circuit from earth, front contact and armature 74, back contact and armature 73, armature 83 and its back contact, winding of series relay 66, winding of vertical magnet 69 to battery. By the operation of magnet 69, the wipers 85 to 88 inclusive of the register selector F are raised four steps, while the relay 66 remains energized throughout the train of impulses. When the off normal contacts 78 close upon the first step of the switch, a circuit is completed for stepping relay 67 in the usual manner and when the normally closed contacts controlled by armature 77 again make on the de-energization of relay 66, a circuit is completed for the rotary magnet 70 so that the switch commences to hunt in known manner. When an idle register translator in this group is found, there will be no earth on the contact with which wiper 87 is then in engagement so that relay 68 will no longer be short circuited and will consequently operate. Thereupon at armatures 81 and 82 a circuit is completed for line relay 30 of the selector E′ extending as follows: battery, upper winding of relay 30, back contact and armature 40, upper trunk conductor, normally closed springs controlled by armature 14, lead 25, front contact and armature 81, wiper 85, contact 89, lead 100, back contacts and armatures 120 and 123 in parallel, armature 137 and its back contact, lead 101, contact 90, wiper 86, armature 82 and its front contact, normally closed springs controlled by armature 18, lower trunk conductor, armature 43 and its back contact, lower winding of relay 30, earth. By the operation of relay 30, relay 31 is energized and the selector E′ is prepared for operation in the usual manner. Relay 68 moreover at armature 83 completes the impulsing circuit over wiper 88 and at armature 84 completes a holding circuit by connecting earth over wiper 87. The connection of earth from armature 74 extends over front contact and armature 84, wiper 87, contact 91, lead 102, normally closed springs controlled by armature 125, armature 127 and its back contact to lead 203. This earth therefore energizes relays 110 and 111, the former by operating armature 130 serving to prevent the release of the connection, while the latter at armature 132 opens the circuit for restoring the sending switch S to normal and at armatures 133 removes earth from leads 160, 161, 162 and 163, so as to open the circuit for restoring the sequence switch S′ to normal. The connection of earth to lead 203 also has the effect of energizing relay 210 which by operating its armature 217 prepares a locking circuit for relay 205, and at armature 209 connects up a timing device T which is provided for preventing the register translator remaining in use indefinitely as will be explained later.

The subscriber will now dial the second letter O in consequence of which ten interruptions will be produced in the circuit of line relay 64 and it will release its armature 73 a corresponding number of times. Each time armature 73 engages its back contact the following circuit is completed: earth, front contact and armature 74, back contact and armature 73, armature 83 and its front contact, wiper 88, contact 92, lead 103, armature 136 and its back contact, lead 202, winding of relay 207, wiper 218 of the master switch M in first position, lead 301, winding of vertical magnet 303 of the register switch J to battery. Relay 207 is energized throughout the train of impulses and at armature 215 completes a circuit for relay 208 which is also made slow to release. At the end of the train of impulses after relay 207 releases, a circuit is momentarily completed from earth, armature 215 and its back contact, armature 216 and its front contact, winding of stepping magnet 212 to battery; the wipers 218 and 219 of the master switch M are therefore moved on one step into their second position.

The subscriber will now dial the third letter R whereupon two impulses will be repeated by relay 64 over a circuit which extends as previously traced to wiper 218 and thence over lead 302 to the rotary magnet 304 of the register switch J. By means of these two series of impulses the switch J is operated to the second contact in the tenth level and the letters OR are thus registered.

At the end of the train of impulses representing the letter R, the master switch M is moved on one step as before into its third position and is then in a condition to record the first numerical digit on the thousands register M'. The circuit over which these two impulses are sent is as before to wiper 218 and then through the winding of relay 231, winding of stepping magnet 227 to battery. The wipers 206 and 244 of the first digit register M' are thus advanced into engagement with the second contacts in their respective banks. Relay 231 is operated throughout the train of impulses and at armature 235 removes earth connected up over off normal contacts 236 from lead 421 so as to prevent the premature sending of impulses as will be more fully appreciated subsequently. In a similar manner the next digit 3 dialled by the subscriber is set up on the hundreds register $M^2$, the next digit 4 on the tens digit register $M^3$ and the fourth and last digit 5 on the units register $M^4$.

As soon however as the master switch M reaches its third position, that is to say immediately all the exchange selecting digits have been stored, a circuit was completed as follows: earth, wiper 219 in third position, lead 400, first contact in the bank of wiper 405 and said wiper, lead 425, back contact and armature 119, back contact and armature 140, winding of impulsing relay 107, interrupter I to battery, the interrupter I being continuously driven at such a speed as to generate approximately ten impulses per second. Earth is also connected from lead 400 by way of wiper 404 of the sequence switch S' in first position, lead 411, wiper 306 of the switch J, second contact in the 10th level of its bank terminal 341 on the left-hand side of the intermediate distributing frame (hereafter referred to as the I. D. F.) jumper to bus-bar 6, lead 363 to the eighth contact in the bank of wiper 114 of the sending switch S, and this earth serves to determine the number of impulses to be sent. When the interrupter I first closes its contacts after the above traced circuit has been completed, relay 107 energizes and at its armature 123 opens a point in the loop across leads 100 and 101, though this operation is without effect since the loop is maintained over armature 120 and its back contact. Relay 107 also at armature 124 completes a circuit for the stepping magnet 115 of the switch S which is arranged to advance the wipers, 113 and 114 on release.

When the interrupter I next breaks the circuit, relay 107 de-energizes and opens contact 124, whereupon magnet 115 de-energizes and advances wipers 114 and 113 into engagement with the succeeding contacts in their respective banks. A circuit is then completed from earth, second contact in the bank of wiper 113 and said wiper, winding of relay 106 to battery. Relay 106 upon operating, at armature 120 removes the shunt around armature 123 so that the loop is then under the sole control of this armature, at armature 121 prepares a locking circuit for relay 105, at armature 457 disconnects lead 455 from lead 100, and at armature 122 completes a circuit over lead 426 from the stepping magnet 402 of the sequence switch S', which magnet is also arranged to step on release.

When relay 107 next energizes, the loop extending to the line relay 30 of the selector E' is opened at armature 123 and the circuit of magnet 115 is again completed. When relay 107 de-energizes, wipers 113 and 114 are again advanced one step and this sequence of operations continues until wiper 114 reaches the eighth contact in its bank to which it will be remembered earth is connected from wiper 219 of the master switch M over lead 366. As soon as wiper 114 reaches this contact, at which time six interruptions will have been produced by armature 123 in the outgoing loop, a circuit is completed from earth over lead 366 as previously traced, wiper 114, winding of relay 105 to battery. Relay 105 upon energizing at armature 116 completes a circuit over wiper 113 for automatically restoring the sending switch S to its home position, at armature 117 completes a locking circuit for itself, at armature 118 opens the circuit of magnet 402 of the sequence switch S' at armature 119 opens the circuit of the impulsing relay 107 and at armature 456 again connects lead 455 to lead 100.

When magnet 402 releases, the wipers 403, 404, 405 and 406 of the sequence switch S' are advanced into engagement with the next contacts in their respective banks, in preparation for the sending of the next series of impulses. When the sending switch S reaches its normal position, the circuit for relay 106 is no longer maintained and the relay releases after a short interval.

When both relays 105 and 106 have released the circuit of the relay 107 is again completed over the same circuit as previously traced except that wiper 405 is now in position 2 and the sending of a further series of impulses commences. The control circuit now extends as follows: earth, wiper 219 in any one of the positions 3—7 according to the speed at which the calling subscriber operates his dial, lead 400, wiper 404, of the sequence switch S' in second position, lead 412, wiper 307 of the switch J and the contact with which it is in engagement, terminal 340 on the left-hand side of the I. D. F. jumper to bus bar 5, lead 365 to the seventh contact in the bank of wiper 114 corresponding to the sending of five impulses. The sending switch S is therefore operated under the control of the interrupter I in the manner previously described, and after five impulses have been sent over the outgoing trunk conductors to operate a selector similar to the selector E', relay 105 will be energized. This then operates to stop the sending of impulses, to effect the return of the switch S to its normal position, and to cause the sequence switch S' to be moved into its third position.

The earth for controlling the number of impulses which shall be sent, now extends over the previously traced path to wiper 404, thence over lead 413, wiper 308 of the switch J and the contact with which it is in engagement, terminal 339 on the left hand side of the I. D. F. jumper to bus-bar 4, and by way of lead 364 to the sixth contact in the bank of wiper 114. Accordingly the third digit which is now transmitted by the sending switch S is a series of four impulses which will operate the succeeding selector in the usual manner. The energizing circuit for relay 107 extends as before except that it is now over the third contact in the bank of wiper 405. At the end of this train of impulses the sequence switch S' is moved on into its fourth position whereupon a circuit is completed as follows: earth, wiper 219 in one of positions 3—7, lead 400, wiper 404 of the sequence switch S' in fourth position, lead 414, wiper 309 of the switch J, terminal 338 on the left hand side of the I. D. F. jumper to terminal X on the right hand side, lead 370, third contact in the bank of wiper 403 and said wiper, through the interrupter contact to magnet 402. The wipers of the sequence switch S′ are thus moved on a further step and the circuits are prepared for sending the first numerical digit. Thus the effect so far has been that the letters TOR representing the digits 402 have been converted into the digits 654 which have been sent out to select the Torrington exchange.

Since the case which is now being considered is that of a connection to an exchange arranged on the ordinary decimal principle, the numerical digits will not be translated but will be retransmitted exactly as dialled by the calling subscriber. It will be assumed that the subscriber is dialling at an average rate, and that by this time he has dialled the first two numerical digits. A circuit is now completed therefore, over the operated off-normal springs 236, armature 235 and its back contact, lead 421, fifth contact in the bank of wiper 405, and said wiper, lead 425, and over the previously traced circuit through the impulsing relay to battery by way of the interrupter I. The contact in the bank of wiper 114 corresponding to the required number of impulses in the train i. e. 2, is now marked over the following circuit: earth, wiper 219 in position 6, lead 400, wiper 404, lead 415, wiper 244 of the thousand's register $M^1$ and the second contact in its bank, lead 452, armature 504 and its back contact, lead 362 to the fourth contact in the bank of wiper 114. The sending switch therefore operates in the manner previously described to send a train of two impulses which will operate a thousand's selector in the Torrington exchange.

When the marked contact is reached by wiper 114, relay 105 is energized with the previously described results, and the sending of the next digit commences, the determining contact being now marked over the wiper 404 in sixth position and wiper 245 of the hundreds register $M^2$. In a similar manner the tens digit 4 and the units digit 5 are sent out to operate the connector at the desired exchange.

After these digits have been sent the sequence switch S′ is moved on in the usual manner into its ninth position and a circuit may now be traced as follows:—earth, wiper 406 and the ninth contact in its bank, lead 420, normally closed springs controlled by armature 139, winding or relay 112 to battery. Relay 112 thereupon operates, completes a locking circuit for itself at armature 139 at armature 137 inserts a resistance 141 in the line loop to prevent the subscriber's line being short circuited with consequent objectionable noises, at armature 140 opens a point in the circuit of the impulsing relay 107 so as to prevent the transmission of any further impulses, and at armature 136 connects earth to lead 103. This earth extends over contact 92, wiper 88, front contact and armature 83, armature 73 and its front contact, lead 62, normally closed springs controlled by armature 16 winding of relay 13 to battery. Relay 13 thereupon operates and at armature 16 locks itself up to the release trunk conductor 11, at armatures 15 and 17 disconnects line relay 64 and at armatures 14 and 18 disconnects the leads 25 and 26 from the outgoing trunk conductors 20 and 22 and connects these through to the called subscriber's line. Relay 64 de-energizes when its circuit is opened and brings about the release of relay 65. When relay 65 falls back the holding earth for all the register translator equipment is removed at armature 74 and the release of this equipment is thus initiated. When armature 75 falls away, the switch F is restored to normal by the operation of release magnet 71 and relay 68 is de-energized by the opening of contacts 74. The removal of earth from lead 102 and hence from lead 203 de-energizes relays 110 and 111, whereupon at armature 133 the circuit of relay 112 is opened and at armature 132 a circuit is completed for restoring the sending switch S to normal in case it should not be there already. Furthermore at the back contact of armature 133 a restoring circuit for the sequence switch S′ is completed over lead 160. The release of relay 110 closes contact 130 whereby a circuit is completed over lead 204 for restoring the digit registers $M^1$, $M^2$, $M^3$ and $M^4$, the master switch M and the register J to normal. Relay 108 is operated in series with the release magnets during this process, and at armature 125 serves to connect earth to contact 91 so as to prevent the register translator equipment being taken into use before it has fully restored to normal. Relay 109 is operated as long as either the sending switch S or the sequence switch S′ are off normal and at armature 127 also connects earth to contact 91. When relay 108 and 109 finally release, the register translator equipment is again in normal condition and may be taken into use for setting up another call.

The purpose and mode of operation of the relay 205 may be briefly mentioned at this point. It is of the two step type and is initially energized over one winding from the interrupter T whereupon it operates its light armature 213, thus completing a locking circuit for itself so long as impulses are not being sent, i. e. contact 215 opens. Thus if at any time while the apparatus is in use a sufficient interval elapses without dialling taking place for the timing device T to close its contact twice, an impulse is sent over lead 201 to operate relay 112. The register translator equipment is then released as just described, and thus cannot remain busy, but not in use, for more than a predetermined time which is arranged to be amply sufficient for ordinary use.

Suppose now that the calling subscriber wishes to set up a connection to the Lothair exchange, which is arranged on the principle according to the invention with 200-point connectors and special selectors which take a maximum of five steps. It will be assumed that the Lothair exchange is reached by way of a tandem exchange and that four exchange selecting digits are therefore necessary for obtaining access to it; these will be taken to be 6535. For the sake of convenience the called party's number will again be taken as 2345 so that the calling man in Western will dial LOT 2345.

It will be assumed further that the calling subscriber on taking down his receiver obtains connection with the same first selector trunk D and hence the register selector F shown in Fig. 1. When he dials the first digit, the register selector F will be raised to the fourth level and will then hunt for an idle set of register translator equipment; suppose that the one shown in the drawing is again obtained. Upon the dialing of the second digit O, the wipers of the register J will be raised to the tenth level, and in response to the dialing of the next digit 4, they will be rotated into engagement with the fourth set of contacts in this level. Since wiper 219 has now reached its third contact, earth will be connected to lead 400 and the sending of the translated exchange code will commence in the manner described above.

In this case however as soon as earth is connected over lead 411 to wiper 306, a circuit is completed from the contact with which the wiper is in engagement, normally closed springs controlled by armature 519, winding of relay 502 to battery. Relay 502 at once operates, locks itself up to lead 203 at armature 519, at armature 520 connects earth through to terminal 337, at armature 509 prepares a circuit for sending a switching current or discriminating impulse and at armatures 514—518 alters the connections from the bank of wiper 244. Since earth is now connected to terminal 337 which is cross-connected to the bus-bar 6, the first series of impulses sent out, will be six; similarly since the connection over wiper 307 extends to terminal 336 and thence to bus-bar 5, five impulses will compose the second train. The third train is controlled over the wiper 308 and terminal 335 and owing to the cross connection will consist of three impulses. The contact engaged by wiper 309 is not in this case connected to terminal X on the right hand side of the I. D. F. but instead to bus-bar 5 consequently a further train of 5 impulses is sent out for exchange selecting purposes. On the termination of this series of impulses the sequence switch wipers will be moved on one step into their fifth position.

A circuit for determining the number of impulses to be sent as the first numerical digit now extends as follows:—earth, wiper 219 in say position 6, lead 400, wiper 404, lead 415, wiper 244 and second contact in its bank, lead 452, armature 504, and its back contact to lead 362 and thence to the fourth contact in the bank of wiper 114 so as to stop the generation of impulses when two have been transmitted. Upon the termination of this series of impulses, the sequence switch S′ is moved on as usual and the apparatus is then in condition to effect the generation of a further train of impulses. The remainder of the numerical digits are now sent out exactly as described for the connection to Torrington. Since in this case the first numerical digit was 2, which is sent out exactly as received, it is not necessary to send a discriminating impulse over the line to effect suitable wiper selection at the connector; consequently the operation of relay 502 is without effect and the connection is set up in the usual manner just as if the switches involved in the connection were all of the normal type.

Suppose, however, that the first numerical digit in the wanted subscriber's number has been 7 instead of 2; in this case after all the exchange digits had been sent, the control circuit would extend from wiper 219 in position 6, lead 400, wiper 404, lead 415, wiper 244 and the seventh contacts in its bank, lead 457, armature 515 and its front contact, lead 362 to the fourth contact in the bank of wiper 114, corresponding to a series of two impulses. Thus in this case, the same effect is produced whether the first digit is 2 or 7, and similarly with 1 and 6, 3 and 8, 4 and 9, and 5 and 0.

In order, however, that the effect at the distant end may be different according to whether 2 or 7 is dialled, a special switching current is sent in the latter case. When the digit dialled is 7, as soon as the wipers of the sequence switch S′ are advanced after the sending of the second numerical digit, relay 105 being still operated, a circuit may be traced as follows: from earth, wiper 219, position 7, lead 400, wiper 404, position 7, lead 417, armature 509 and its front contact, lead 401, seventh contact in the bank of wiper 206 and said wiper, lead 455, front contact and armature 456 to lead 101 extending to the lower talking conductor. This earth connection remains on over armature 457 and its back contact after relay 105 de-energizes and is only removed when relay 106 again operates immediately prior to the sending of the next series of impulses.

In order that the purpose of these special arrangements may be fully appreciated it will, at this point, be desirable to describe more fully the repeater and selector and connector switches shown in Fig. 6, the repeater being in the originating Western exchange, while the switches are in the Lethair exchange. It will be seen from the arrangements at the register translator just described that the first selector never has more than five impulses sent to it. In order that the upper half of the bank may be utilized however the switch is provided with two sets of wipers which are spaced five steps apart and arrangements are made for it to hunt simultaneously over the contacts engaged by both sets of wipers, the line connected with being then the one first found idle by either set of wipers. Corresponding levels i. e. 1 and 6, 2 and 7, etc., are arranged to lead in the same direction so that a group of 20 trunks is obtained instead of the normal 10 and in consequence an appreciable reduction in the number of second selectors may be made. The second selectors involved in the connection are not shown, as they are of standard type, but the position they occupy in the connection is indicated by the dotted rectangle D′.

The connector shown in Fig. 6 is slightly different from the standard construction in that it also has two sets of wipers, but in this case each has access to a corresponding complete bank of 10 levels. The bringing into use of the other set of wipers when necessary, i. e. when a first numerical digit less than 5 is dialled is effected unless one of the speaking leads is momentarily earthed when the switch is taken into use as above described. This earth is arranged to short circuit the relay for changing over the wipers, so that it does not then operate.

The actual operation of the apparatus shown in Fig. 6 will now be explained in rather more detail. Dealing first with the repeater R, when this is taken into use relays 600 and 601 are energized in series over the normally closed springs controlled by armatures 611 and 612 and the loop closed by armatures 120 and 123. Relay 600 thereupon at armature 602 completes a circuit for release relay 604 which at armature 605 connects earth to release trunk conductor 599 to maintain the preceding switches operated, and at armature 606 prepares the impulsing circuit. Relay 600 also operates armature 613 thereby completing a circuit over trunk conductors 614 and 615 and the left hand winding of relay 610 for the line relay 620 of the incoming selector $E^2$. This on operating, at its armature 621 completes a circuit for relay 622 so that the selector $E^2$ is prepared for operation in the usual manner.

When a train of impulses is now sent corresponding to the first numerical digit, for instance the digit 7 dialled by the calling subscriber, relays 600 and 601 will both be de-energized momentarily twice and relay 600 will operate its armature 613 to repeat the impulses over the trunk line comprising conductors 614 and 615 to the selector $E^2$. Upon the first de-energization of relay 600 a circuit is completed from earth at armature 602 and its back contact, armature 606 and its front contact, winding of relay 608 to battery; relay 608 then by operating its armature 609 short circuits the left hand winding of the shunt field relay 610 so as to improve the impulsing. When impulses are repeated by the operation of armature 613, relay 620 de-energizes correspondingly and on each de-energization completes a circuit from earth, back contact and armature 641, back contact and armature 646, armature 621 and its back contact, armature 623 and its front contact, winding of series relay 625, winding of vertical magnet 650 to battery. By the operation of magnet 650 both sets of wipers are raised two steps and as soon as the off-normal contacts 627 close, a circuit is completed from earth, front contact and armature 624, off normal springs 627, front contact and armature 626, both windings of shunt field relay 629 in parallel, operated off-normal contact 635, interrupter contacts 634 to battery. Relay 629 therefore operates and at armatures 630 and 631 completes a locking circuit through both its windings and at armature 632 prepares a circuit for the rotary magnet 633. Relay 629 it should be mentioned, is of the shunt field type and only operates its armatures when both its windings are energized by current in the proper direction. When relay 625 releases at the end of the series of impulses, a circuit is completed over the normally closed springs controlled by armature 626 for rotary magnet 633, so that the wipers are rotated one step, the circuit of relay 629 being then opened by the interrupter contact 634. The further operation of the switch depends upon the condition of the lines with which the test wipers 648 and 649 are now in engagement. If both of these wipers are resting on earthed contacts a circuit is again completed for both windings of relay 629, over armature 639 and 644 and their back contacts, so that it again operates its armature 632 and rotary magnet 633 moves the wipers a further step. This operation will continue as long as both wipers continue to find earth. Suppose now that test wiper 649 finds earth but test wiper 648 does not; under these circumstances current only flows through one winding of relay 629 and it cannot operate. Relay 637 however which has previously been short circuited now operates and at its armature 645 opens the circuit of relay 636, at armature 644 completes a locking circuit for itself, at armature 646 opens the circuit of the release magnet and at armatures 643 and 647 connects the speaking leads through to the second selector D′. It should be mentioned that one of the relays 637 and 636 is adjusted to operate slightly quicker than the other, so that in the event of each test wiper coming upon an idle line at the same time, there shall be no doubt as to which line will be taken into use, since each relay on operating opens the circuit of the other. The selector D′ is standard in all respects and its operation therefore need not be described.

Since it has been assumed that the calling subscriber dialled the digit 7 which has been converted at the register translator into 2, it will be necessary to send a discriminating impulse which is effected at the register translator in the manner that has already been described. The effect of this at the repeater R is to short circuit relay 601 whereupon it releases and a circuit is completed from earth, armature 603, and its back contact armature 607 and its front contact, back contact and armature 609, armature 613 and its front contact, lower trunk conductor 615, armature 642, and its back contact, armature 647 and its front contact, through the selector D′ to lead 652, normally closed springs controlled by armature 633, lower winding of relay 662 to earth. It should be noted that this earth connection will be on the line when the selector D′ switches through; consequently relay 662 is short circuited and does not energize so that the first set of wipers of the connector is used. The connection of lead 652 to the winding of relay 662 is broken by the operation of armature 663 when release relay 656 operates. In case there had been no earth on the line when the connector was taken into use, relay 662 would have energized in series with the upper winding of line relay 653 and at its armature 667 would have completed a locking circuit for itself and at its armature 665, 666 and 668 connected up the second set of wipers.

The operation of the connector is in all other respects standard, but may be briefly described as follows:—When the switch is taken into use, line relay 653 is energized over the loop and the normally closed springs controlled by armature 654 and 655 and either the special earth or the winding of relay 662, and completes a circuit for the release relay 656. Upon the receipt of the first series of impulses, relay 653 de-energizes a corresponding number of times, and on each de-energization completes a circuit for the vertical magnet in series with the relay 657, so that the wipers are raised a corresponding number of steps. Owing to the shifting of the off-normal contacts, the next series of impulses is transmitted to the rotary magnet and the wipers are rotated accordingly. When they come to rest and relay 660 de-energizes, a busy test is made by relay 659 and if the required line is found idle, the wiper relay 661 is energized in series with the cut-off relay 670 of the wanted subscriber's line switch. This latter relay operates its armatures only sufficiently far to clear the called line of its normal battery and earth connections, but not to connect up the wipers of the line switch. Ringing current is then sent out from the ringing generator RG and when the wanted party replies, the ringing trip relay 658 is operated. The speaking leads are thus switched through, whereupon the back bridge relay 671 energizes and reverses the current flow back over leads 651 and 652. The flow of current is now in such a direction as to permit the shunt field relay 610 in the repeater R to operate so that at its armatures 611 and 612 it also reverses the current flow back over the connection. This reversal is then used for supervision, metering or like operation according to standard practice. The release of the connection takes place in the usual manner when the calling party hangs up his receiver.

Consider now the case in which a call is to be extended to a subscriber in the Condor exchange which it will be assumed is a comparatively small exchange of a capacity not exceeding 4000 lines; under these circumstances and according to the invention, it is possible to save the first switching stage entirely. This is effected by the use of large capacity switches throughout, each having two sets of wipers and corresponding banks the connectors being similar to those just described in the Lothair exchange, while the selectors are standard except that they have two sets of wipers and means as in the connector for changing over the wipers. The operation of these switches is controlled according to the value of the first digit by sending discriminating impulses over the line at the appropriate instant in a manner similar to that described for connections to the Lothair exchange.

Suppose that the wanted subscriber's number is CONdor 1234; the calling subscriber will therefore after removing his receiver, first dial the letters CON, and then the numbers 1234. Suppose as in the previous case that he obtains access from his line switch to the first selector trunk D shown in Fig. 1 and hence that the register selector F is operated to the fourth level as previously described. Assume further that the switch F then again takes into use the set of register translator equipment shown in the drawings.

In response to the dialling of the letters O and N, the register switch J will be raised to the tenth level as before, and will then be rotated into engagement with the sixth contact in that level. The wiper 219 of the master switch M being now in its third position, the sending of the exchange code will at once start and it will be seen from the drawing that the cross connections are such that the digits 406 are translated into the digits 348. As soon however as earth is connected to lead 400 the following circuit is completed: earth, wiper 219, position 3, lead 400, wipers 404, lead 411, wiper 306 and the contact with which it is in engagement, normally closed springs controlled by armature 506, winding of relay 500 to battery. Relay 500 therefore operates, at armature 506 locks itself up to lead 203, at armature 507 connects wiper 306 through to terminal 345 on the left-hand side of the I. D. F. and at armature 505 completes a circuit for relay 501. Relay 501 which then operates, at armature 513 connects earth to lead 449 and at armatures 508, 510, 511 and 512 produces changes in the circuits from the banks of wipers 206 and 244, the full importance of which will be more fully understood presently.

When the exchange selecting digits 348 have been sent out and sequence switch S′ reaches position 4, a circuit is completed from earth, wiper 219, lead 400, wiper 404, position 4 lead 414, wiper 309, terminal 342, jumper to terminal X, lead 370, fourth contact in the bank of wiper 403, interrupter contact, winding of rotary magnet 402, to battery; the sequence switch S′ is thus moved into fifth position. A circuit is now completed as follows: earth, armature and front contact 513, lead 449, fifth contact in the bank of wiper 403 and said wiper, interrupter contact and winding of magnet 402 to battery; the wipers of the sequence switch S′ are thus advanced into sixth position. It will be seen that the sequence switch wipers have thus passed through the position in which they would send a digit corresponding to the first numerical digit dialled by the calling subscriber, and even if the calling party should not yet have dialled the first numerical digit it will be impossible for this to be transmitted untranslated. No further operations take place until the second numerical digit has been dialled, this then being re-transmitted to operate an incoming first selector in the Condor exchange. Since, however, the first numerical digit is 1, a discriminating earth will have been connected up over the following circuit as soon as the three exchange selecting digits have been sent out; earth, wiper 219 in position 4, lead 400, wiper 404 in sixth position, lead 416, armature 508 and its front contact, lead 415, first contact in the bank of wiper 244 and said wiper, lead 451, armature 503 and its front contact, lead 455, armature 456 and its front contact or armature 457 and its back contact to lead 100. This circuit is also completed over lead 415 when the switch S′ is in position 5. The effect of this earth connection is to short circuit a relay such as 601 in a repeater similar to R, whence the earth connection is repeated so as to short circuit a relay in the first selector similar to that provided in the connector shown in Fig. 6, so that the normal set of wipers is used. The train of impulses for operating this selector consists of two impulses which are sent out in the usual manner.

When the sequence switch again steps on, a circuit similar to that just described is completed extending over wiper 404 in seventh position, lead 417, armature 510 and its front contact, lead 469, first contact in the bank of wiper 206 and said wiper, lead 455, armature 456 and its front contact or armature 457 and its back contact to lead 100 as before. This therefore brings about the short circuiting of a relay such as 662 in the connector so that again the normal set of wipers is used. The other digits 3 and 4 are then sent out in known manner and the register translator equipment is released as in the case previously described.

It will be seen by referring to the scheme of connections that if the first digit of the number in the Condor exchange had been 2, a discriminating impulse would have been sent to the first selector, and consequently the wipers would not have been changed over, but that a discriminating impulse would have been sent to the connector so that therefore, the second set of wipers would have been used. In case the first digit is 3, the discriminating earth is used to operate the connector only, while if the first digit is 4 no discriminating earth at all is sent so that both selector and connector employ their second set of wipers. It will therefore be seen that by means of this arrangement, it is possible to save the first switching stage entirely by the use of improved large capacity switches according to the invention with suitable modifications in the register translator. The principle is clearly also applicable to the case of a 2000 or 200 line exchange; in the former case, either the selector or the connector may be arranged with two sets of wipers.

The other arrangements provided in the register translator are very similar to those described in detail in the British specification No. 194,580 previously referred to. For instance, if the subscriber wishes to obtain access to the complaint operator, he will dial the letters COM, whereupon it will be assumed he obtains use of the register translator equipment shown, and the switch J after being raised to the tenth level is rotated into engagement with the fifth set of contacts. Inspection of the connections at the I. D. F. will show that the translation which takes place in this case is into the digits 60 whereupon switching over is at once effected and no numerical digits are therefore sent.

Contacts 1 and 3 in level 10 of the switch J are assumed to correspond to no exchange code and they are therefore wired together as dead numbers. The effect of this is that should the subscriber owing to some error in the manipulation of his dial set the switch J on to these contacts, the call will be trunked to a special operator who will then inform him of his mistake and instruct him to try again. The sending out of the required code may be effected by suitable cross connections, though if the code comprises more than 3 digits a special code relay must be used, as now to be described.

An information operator, who will probably be located in another exchange, is reached by dialling the letters INF and as it is assumed that levels 1 and 4 of the switch F are multipled together, it is still possible for the register translator equipment shown to be taken into use. In this case, however, the switch J will not be operated to the tenth level but to the sixth, and it is assumed that on this level connection is made by the wipers of the switch J with contacts connected to terminals 346–349, inclusive. A code comprising the digits 6, 5 and 3 is first sent out and when earth is connected to terminal 346 the special code relay 430 is operated. This by operating its armatures 432, 433, 434 and 435 controls the sending of the further digits 32 and then effects switching over.

It should be mentioned that the relays 500, 501 and 502 could be provided in common to a number of exchange codes corresponding to a number of exchanges in which the special switches and trunking arrangements were employed. This presents no difficulties since the translation effected by these relays is a related one in which any particular digit is always translated in a particular manner as opposed to the unrelated translation of the exchange code.

It has been assumed throughout the description that the special arrangements are used only within particular exchanges, and that no alteration is made in the normal inter-exchange trunking. It is not however intended that the invention should be thus limited, and it will clearly be quite possible to employ an improved trunking scheme for trunking between exchanges as well as within special exchanges. This will mean that two different exchange codes dialled by a calling party may be converted into the same exchange code for re-transmission and calls routed differently in one case in response to the sending of a switching current or discriminating impulse. From what has already been said, the method of achieving this object will be at once apparent to those skilled in the art; probably the use of an extra contact on the code relay suitably connected would be the most desirable solution. It may be mentioned that in the circuit shown in the drawings the feature disclosed in the British specification No. 194,580 has been omitted whereby if the sender has sent out the full exchange code before the subscriber dials the first numerical digit, the register translator may be released and subsequent digits dialed by the calling party operate switches direct. This feature could, however, be retained for normal connections and could then be cut out by the operation of relays 500, 501 or 502. For connections to the special exchanges it would hardly be desirable to include it, as it would be essential for switching not to take place until the discriminating impulse, if any, had been sent to the connector.

A slight modification which might be employed with advantage in certain cases makes use of the principle of grading according to which the contacts giving later choices in some of the levels are multipled together. Consider the switch $E^2$ for example; it might be arranged with only one set of wipers and so that instead of levels 2 and 7, say, leading to second selectors and connectors of the same group as previously proposed, the first 5 contacts in each level led to different groups of connectors each of standard type, while the last 5 contacts where multipled together and led by way of second selectors to large capacity connectors similar to H in Fig. 6. In this case it is clearly not necessary to translate the first numerical digit, but it may be sent out exactly as received. Obviously also the discriminating impulse would only be required if one of the last 5 contacts was reached; however as there would be no means of notifying this at the sender, the discriminating impulse would be sent out in all cases in which the first numerical digit was 6—0 and if it was not required it would do no harm.

The arrangement just described gives a group of 15 trunks leading in one direction, and this number may be varied slightly by altering the number of multipled contacts. In case a much larger group were required however, it might be desirable to make the first selector with two sets of wipers and two separate banks. Simultaneous hunting would then take place over both banks in each of which grading would be employed between corresponding levels, such as 2 and 7, by which means a group comprising as many as 30 or more trunks could be obtained.

Having now particularly described and ascertained the nature of our said invention and in what manner the same is to be performed, we declare that what we claim is:

1. In a multi-office telephone system employing register translators for translating the portions of telephone numbers indicative of the called offices, means in the register translators for translating the portion of telephone numbers indicative of the subscribers' lines in the called offices into combinations of impulse series and switching currents, a single wire circuit over which the switching currents are transmitted, and a two-wire circuit extending from the transmitter over which the impulse series are transmitted.

2. In a multi-office telephone system employing register translators for translating series of stepping impulses corresponding to the Office designations of called lines into series of similar impulses which may differ in number and value from the original impulses, means in the register translator whereby the series of stepping impulses representing the numerical designation of the called line are translated into a combination of two-wire stepping impulses and a single wire switching current which differs in character from the said stepping impulses.

3. In a telephone system as claimed in claim 2, means in the register translators whereby the translation of the numerical designation of called lines is effected responsive to calls destined for certain predetermined offices.

4. In a multi-office telephone system employing register translators for translating series of stepping impulses corresponding to the office designations of called lines into series of similar impulses which may differ in number and value from the original impulses, means in the register translator whereby the series of stepping impulses representing the numerical designation of the called line are translated into a combination of stepping impulses and a switching current, means in the register translators whereby the translation of the numerical designation of called lines is effected responsive to calls destined for certain predetermined offices, and means including a switching relay operated in response to the setting of the office indicating portion of the registering apparatus to indicate certain called offices for bringing about the said operation of said translating means.

5. In an automatic telephone system employing register senders for controlling the operation of the automatic switches, means associated with the register senders in one office and responsive to setting of the registering portion of the register senders to a position corresponding to a particular other office for preventing the retransmission of one of the digits of the numerical designation stored on the registering portion of the register senders.

6. In an automatic telephone system employing register senders controlled over calling lines and employing large capacity step-by-step switches having a plurality of sets of wipers each and being controlled by the register senders, means for operating the registering portion of the register senders to record digits in the numerical designations of called numbers, means controlled by the registering portion of the register for generating and retransmitting impulses to the step-by-step switches and translating arrangements for reducing the number of series of impulses in the retransmitted number to correspond to the reduced number of switches made possible owing to the fact that the switches of the large capacity type are used, and for effecting wiper selection at predetermined ones of said switches.

7. In a telephone system, a thousands selector having a single unitary bank of contacts, a register sender operated in accordance with either of ten different digits to set the thousands selector in either of five different positions, a set of wipers for said switch having a free hunting movement over any one of five of the levels of the associated bank, depending upon the position in which the switch is set, an alternate set of wipers for said switch similarly having a free hunting movement over any one of the other five levels of the associated bank, a switching relay for disconnecting the normal set of wipers and for connecting up the alternate set of wipers, and means for operating said switching relay or not, depending upon the busy or idle condition of the trunk lines encountered by the two sets of wipers.

8. In a telephone system, a four-thousand line office containing hundreds selectors and connectors, trunk lines incoming to said office and terminating in said hundreds selectors, two sets of wipers for said hundreds selectors and two sets of wipers for said connectors, means for operating a hundreds selector in accordance with the corresponding digit in a telephone number, means for operating a connector to complete the connection in accordance with the tens and units digits in a telephone number, and means for effecting wiper selection at the said hundreds selector and at the connector in accordance with the thousands digit in the said telephone number.

9. In a director for automatic telephone systems, an office register, a digit register, a locking relay operated when the office register is in a position corresponding to a certain office, and means controlled by the locking relay for preventing the retransmission of one of the digits registered on the digit register.

10. In a director for automatic telephone systems, an office register, a digit register, a locking relay operated when the office register is in a position corresponding to a certain office, and means controlled by the relay for transmitting switching current.

11. In a director for automatic telephone systems, an office register, a digit register, a locking relay operated when the office register is in a position corresponding to a certain office, means controlled by the relay for preventing the retransmission of one of the digits registered on the digit register and means controlled by the relay for transmitting switching current.

12. In a director for automatic telephone systems, an office register, a digit register, a locking relay operated when the office register is in a position corresponding to a certain office, and means controlled by the relay for altering the value of one of the digits registered on the digit register.

13. In a director for automatic telephone systems, an office register, a digit register, a locking relay operated when the office register is in a position corresponding to a certain office, means controlled by the relay for altering the value of one of the digits registered on the digit register, and means controlled by the relay for transmitting switching current.

14. In a director for automatic telephone systems, an office register, a digit register, a locking relay operated when the office register is in a position corresponding to a certain office, a second locking relay operated when the office register is in a position corresponding to a certain other office, means controlled by the first relay for preventing the retransmission of one of the digits registered on the digit register, and means controlled by the second relay for altering the value of one of the digits registered on the digit register.

15. In a director for automatic telephone systems, an office register, a digit register, a locking relay operated when the office register is in a position corresponding to a certain office, a second locking relay operated when the office register is in a position corresponding to another office, means controlled by the first relay for preventing the retransmission of one of the digits registered on the digit register, means controlled by the first relay for transmitting switching current, and means controlled by the second relay for altering the value of one of the digits registered on the digit register.

16. In a director for automatic telephone systems, an office register, a digit register, a locking relay operated when the office register is in a position corresponding to a certain office, a second locking relay operated when the office register is in a position corresponding to another office, means controlled by the first relay for preventing the retransmission of one of the digits registered in the digit register, and means controlled by the second relay for transmitting switching current.

17. In a director for automatic telephone systems, an office register, a digit register, a locking relay operated when the office register is in a position corresponding to a certain office, a locking relay operated when the office register is in a position corresponding to another office, means controlled by the first relay for preventing the retransmission of one of the digits registered on the digit register, means controlled by the first relay for transmitting switching current, and means controlled by the second relay for transmitting switching current.

18. In a director for automatic telephone systems, an office register, a digit register, and a locking relay controlled in accordance with certain settings of the office register for changing the value of certain settings of the digit register.

19. In an automatic telephone system, a register sender in one office, a plurality of other offices, means for operating the register sender to store and retransmit groups of digit impulses, said groups representing both the office and the particular station in the office to which a connection is to be set up, and means effective responsive to the setting of the registering portion of the register sender to a position corresponding to a particular one of the other offices, for preventing the retransmission of one of the stations indicating digits stored.

20. In a register sender, an office register, a digit register, an impulse transmitter, and means dependent upon the particular setting of both the office register and the digit register for transmitting switching current in addition to the impulses.

21. In a register sender, an office register, a digit register, an impulse transmitter, means dependent upon the particular setting of both the office register and the digit register for transmitting switching current in addition to the impulses, and means dependent upon the particular setting of the office register and independent of the particular setting of the digit register for absorbing one of the digits.

22. In an automatic telephone system, a large capacity office, a small capacity office, means for extending a connection to a station in either office from a third office, said means including a register sender having an office register, a digit register, means for transmitting digits corresponding to the settings of both the office and the digit registers, and means in the register sender effective only if the small capacity office is called for absorbing one of the digits on the digit register.

23. In an automatic telephone system, a large capacity office, a small capacity office, means for extending a connection to a station in either office from a third office, said means including a register sender having an office register, a digit register, means for transmitting digits corresponding to the setting of both the office and the digit registers, means in the register sender effective if the small capacity office is called for absorbing one of the digits on the digit register, and means in the register sender effective if the large capacity office is called and dependent upon the setting of the digit register, for transmitting switching current in addition to the series of impulses.

24. In a telephone system, a switch having two sets of wipers, a trunk line incoming to said switch, and a wiper-switching relay normally operated over said trunk line responsive to the seizure of the switch.

25. In a telephone system, a switch having two sets of wipers, a trunk line incoming to said switch, a wiper-switching relay normally operated over said trunk line responsive to the seizure of the switch, and means for grounding a conductor of said trunk line prior to the seizure of said switch to prevent the operation of said relay when seizure takes place.

26. In a telephone system, a switch having two sets of wipers, a telephone line incoming to the switch, and a wiper-switching relay normally connected to one of the conductors of said line.

27. In a telephone system, an impulse sending device, a closed circuit path, means for pre-setting said device for causing it to send an open impulse to said circuit path, means for pre-setting said device for causing it to send a closed impulse to said circuit path while maintaining said circuit path closed, means for pre-setting said device for sending a single kind of said impulses to said circuit, and means for pre-setting said impulse device for sending a combination of open and closed impulses to said circuit path.

28. In a telephone system, an impulse sending device, a closed circuit path, means for variably pre-setting said device to send a plurality of open impulses to said circuit path responsive to said pre-setting, and means for causing the impulse sending device to send successive impulses to said circuit path wherein the respective impulses may vary in character in accordance with the said pre-setting and wherein said character is without respect to the length of the respective said impulses.

29. In a multi-office telephone system employing register translators for translating the portions of telephone numbers indicative of the called offices, means in one of said register translators for translating the portions of telephone numbers indicative of the subscribers' lines in the called offices into combinations of impulse series and switching currents, a circuit outgoing from said register translator over which the switching currents are transmitted, and another circuit outgoing from said register translator over which the impulse series are transmitted.

RICHARD MERCER.
FRANK TENCH.